Nov. 20, 1962  A. J. STEPHENS  3,064,982

BEARING SEAL

Filed April 3, 1961  2 Sheets-Sheet 1

INVENTOR.
ALLEN J. STEPHENS
BY
ATTORNEY

Nov. 20, 1962   A. J. STEPHENS   3,064,982
BEARING SEAL

Filed April 3, 1961   2 Sheets-Sheet 2

INVENTOR.
ALLEN J. STEPHENS
BY
ATTORNEY

United States Patent Office 3,064,982
Patented Nov. 20, 1962

3,064,982
BEARING SEAL
Allen J. Stephens, Englewood, Colo., assignor to The Mechanex Corporation, Englewood, Colo., a corporation of Colorado
Filed Apr. 3, 1961, Ser. No. 100,195
2 Claims. (Cl. 277—95)

This invention relates to an oil-lubricated vehicle hub and more particularly to a wheel oil seal for sealing the hub of a wheel about an axle spindle so as to prevent the escape of lubricating fluid from the hub as the wheel rotates thereon.

The principal object of the invention is to provide a highly efficient wheel oil seal which can be quickly and easily installed in a wheel hub of a vehicle by comparatively inexperienced help without the use of tools, which will require no changes to be made in a conventional wheel hub or its bearings, which will act to positively prevent the escape of lubricating oil from the hub about the axle spindle both when the vehicle is traveling at high road speeds and when standing at rest for extended periods, and which will provide a wheel oil seal structure which will resist the entrance of water and road debris to the hub.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
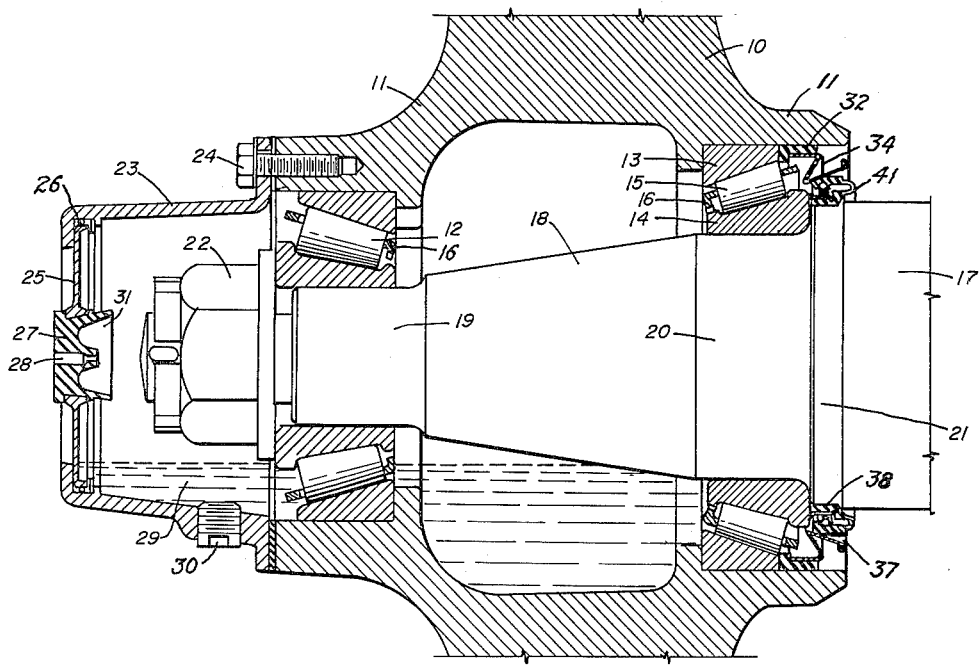
FIG. 1 is a fragmentary, longitudinal section through the hub portion of a conventional vehicle trailer wheel in place upon an axle spindle showing the position of the improved wheel oil seal therein.

In the drawing typical elements of a trailer-type vehicle wheel are designated by numeral as follows: wheel 10, hollow wheel hub 11, outer wheel bearing 12, inner wheel bearing cup 13, inner wheel bearing cone 14, inner wheel bearing rollers 15, roller bearing cages 16, axle 17, axle spindle 18, outer bearing land 19, inner bearing land 20, spindle shoulder 21 and wheel retaining nut 22.

This invention contemplates closing the outer extremity of the hub 11 by means of hub cap 23 secured in place by means of suitable cap screws 24. The outer face of the cap 23 is closed by means of a transparent plastic disc 25 sealed therein as shown at 26. A resilient hub plug 27 is concentrically mounted in the disc 25 and provided with a breather port 28 for preventing pressure build-up within the hub. A filling plug 30 is also provided which, when removed, allows lubricating oil to be introduced into the hollow hub 11. The hub plug 27 is provided with an internal skirt 31 which tends to centrifugally throw oil away from the breather port 28 to prevent the oil from being forced therethrough due to temperature variations.

Figure 3:
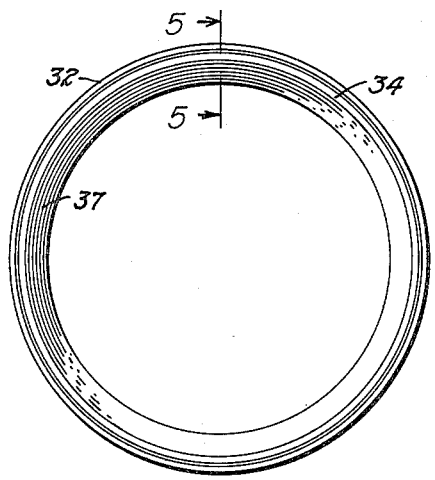
FIG. 3 is a detail, inner face view of a hub ring assembly employed in the improved wheel oil seal.
Figure 5:
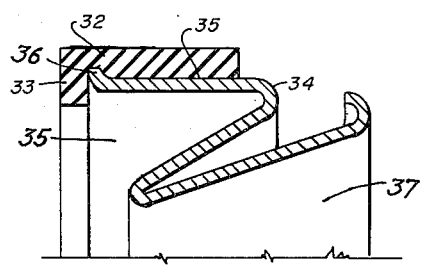
FIG. 5 is an enlarged fragmentary cross-section through the hub ring assembly, taken on the line 5—5, FIG. 3.
Figure 4:
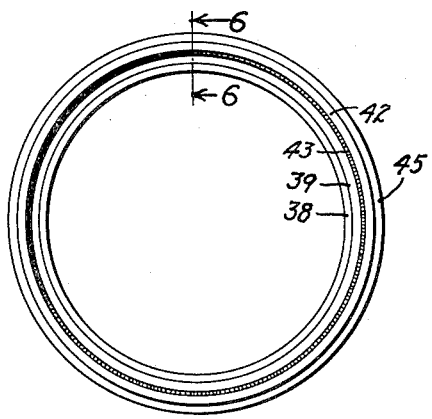
FIG. 4 is a similar detail, outer face view of a spindle ring assembly used therein.
Figure 6:
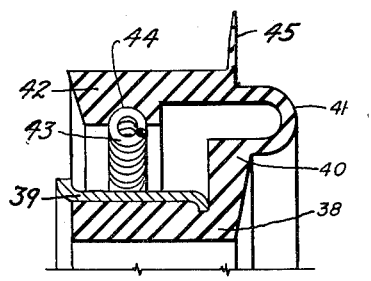
FIG. 6 is a similarly enlarged fragmentary cross-section through the spindle ring assembly, taken on the line 6—6, FIG. 4.

The improved oil seal is positioned at the inner extremity of the hollow hub 11 and comprises a two part, rotating wheel seal assembly, as shown in FIGS. 3 and 5, which fits within the inner extremity of the hub 11 against the bearing cup 13 and a stationary axle seal assembly, as shown in FIGS. 4 and 6, which fits around the spindle shoulder 21.

The wheel oil seal assembly comprises a resilient, annular expansible hub gasket 32, having an internally flanged outer edge 33. The gasket 32 is molded from rubber, neoprene or similar resilient material and is frictionally forced internally into the hub 11 until the flanged edge 33 bears tightly against the bearing cup 13. The gasket 32 is urged radially outward into tight sealed engagement with the interior of the hub by a resilient metal ring 34. The ring 34 is formed from spring brass or bronze and has a somewhat Z-shaped cross-section so as to provide an outer cylindrical portion 35 having an outwardly-turned retaining edge 36, and an inner, flaring conical portion 37. Both portions, although formed of relatively thin material, are extremely rigid due to the Z-shape of the ring 34. The cylindrical portion 35 is compressed against the inside of the gasket 32 to urge the latter radially outward into sealing engagement with the hub while the restaining edge 36 imbeds itself in the gasket to retain the metal ring 34 in place.

Figure 2:
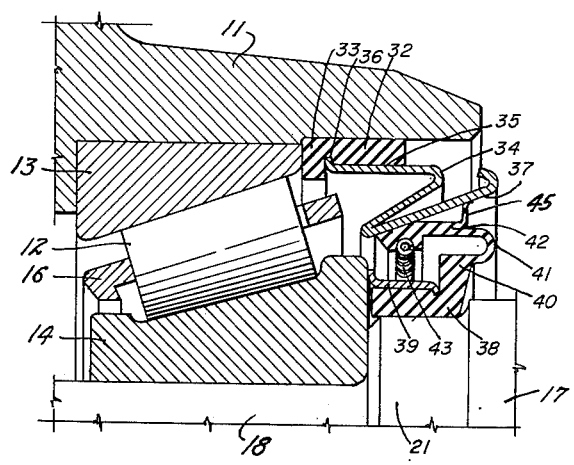
FIG. 2 is an enlarged fragmentary cross-section through the wheel oil seal of FIG. 1.

The axle seal assembly comprises an elastic, resilient shoulder band 38 of rubber neoprene or similar elastic material which is frictionally forced over the spindle shoulder 21 and which is held in tight sealing engagement therewith by means of an annular metallic confining hoop 39. The band 38 is provided with a relatively-thick, peripheral flange 40 around its inner face from which a relatively thin, U-shaped, annular bend 41 projects to support a relatively-thick friction skirt 42 in resilient, concentric, spaced relation about the band 38. When disassembled, the friction skirt 42 and the band 38 are substantially parallel in cross-section, as shown in FIG. 6. When in place in the wheel, the flexible skirt is bent radially inward throughout its entire periphery by the conical portion 37 of the metal ring 34, as shown in FIG. 2, so as to maintain frictional sealing contact throughout its periphery due to its inherent elasticity. The frictional sealing contact between the skirt 42 and the conical portion 37 is substantially increased by a compressed, expansible, endless, annular circular, coil spring 43 which is positioned in a spring receiving groove 44 internally of the skirt 42.

The improved wheel oil seal is installed by pressing the axle seal assembly part way onto the spindle shoulder 21 and forcing the wheel seal assembly into the inner extremity of the hub until the hub gasket 32 seats tightly against the bearing cup 13. The wheel, with its bearings in place, is now pushed onto the bearing lands 19 and 20 and the retaining nut 22 is tightened.

As the wheel bearings slide into position, the bearing cone 14 will push the shoulder band 38 onto the spindle shoulder 21, and in so doing will maintain tight contact therewith to the final working position, and the conical portion 37 will slide over and about the friction skirt 42 to flex the latter radially inward, as shown in FIG. 2. As the seal is installed, the resilient material of the hub gasket 32 will be highly compressed between the inside of the hub and the metallic ring 34 and the material of the shoulder band 38 will be similarly compressed between the shoulder 21 and the confining hoop 39 to maintain an oil tight seal at both points. In addition, the flanged outer edge 33 of the hub gasket 32 is pressed tightly against the bearing cup 13 and the edge of the shoulder band 39 is similarly tightly pressed against the bearing cone 14 to still further increase the sealing properties at all fixed points.

The hub cap 23 is now replaced, the hub is partially filled with lubricating oil, as indicated in FIG. 1, and the wheel is ready for use. It will be noted that no changes have been required in the conventional hub or spindle and no tools were required for installation.

It will be noted that oil thrown from the inner bearing will be caught in the Z-shape cross-section of the metallic ring 34 and will drain back through the bearing to the hub. It will also be noted that since the friction skirt 42 covers substantially of the internally exposed area of the conical portion 37, the tendency for oil to be centrifugally forced through the moving friction seal is eliminated and the oil is permanently sealed in the hollow hub under all conditions.

Any water, sand, ice or snow tending to enter between the conical portion 37 and the friction skirt 42 will be thrown outward by the rotating conical portion 37.

To still further resist the entrance of foreign materials to the annular friction bearing surface, a relatively-thin, flexible, annular dust lip 45 is moulded integrally with the outer edge of the friction skirt 42. The conical portion 37 of the ring 34 contacts this annular dust lip 45, as the wheel is brought into position, to flex the lip, as shown in FIG. 2, to provide a second annular friction bearing surface to prevent the entry of deleterious materials.

While a specific form of the improvement has been described and illustrated herein, it is to be understood that the same may be varied within the scope of the appended claims, without departing from the spirit of the invention.

Having thus described the invention, what is claimed and desired to be secured by Letters Patent is:

1. A wheel oil seal for sealing an axle spindle to a wheel hub rotatably mounted on said spindle comprising: an annular hub gasket forced into said hub; a metal ring fitted within said hub gasket; an outer cylindrical portion formed on said ring, said latter portion bearing against said gasket and urging the latter outwardly against said hub; an inner conical portion rigidly and integrally formed on said ring about said spindle, said conical portion inclining inwardly toward said spindle as said hub is approached; and an annular, expansible axle seal assembly mounted on said spindle and forming an annular frictional contact with the internal surface of said conical portion to seal the latter to said axle seal assembly, said axle seal assembly having a resilient spindle band surrounding said spindle; an annular U-shaped resilient roll formed on said band; and an annular friction skirt resiliently supported by said roll concentrically about and in spaced-relation to said band and in frictional engagement with said conical portion, said conical portion acting to flex said skirt radially inward throughout its circumference to provide an annular friction bearing surface between said skirt and said conical portion, said metal ring being formed of relatively thin material and having a substantially Z-shaped cross section, the upper bar of the Z forming the outer cylindrical portion and the lower bar of the Z being inclined upwardly to form the conical portion.

2. A wheel oil seal as described in claim 1 in which the free edge of the cylindrical portion is flanged outwardly so as to imbed itself in said gasket.

References Cited in the file of this patent

UNITED STATES PATENTS

| | | |
|---|---|---|
| Re. 24,940 | Stephens | Feb. 28, 1961 |
| 2,316,713 | Proctor | Apr. 13, 1943 |
| 2,643,918 | Becker | June 30, 1953 |
| 2,714,025 | Heinrich | July 26, 1955 |
| 2,752,177 | Stevenson | June 26, 1956 |
| 2,819,929 | Hunt | Jan. 14, 1958 |
| 2,878,084 | Bermingham | Mar. 17, 1959 |